US007293202B2

(12) United States Patent
Kamani et al.

(10) Patent No.: US 7,293,202 B2
(45) Date of Patent: Nov. 6, 2007

(54) ISOLATING THE EVALUATION OF ACTUAL TEST RESULTS AGAINST EXPECTED TEST RESULTS FROM THE TEST MODULE THAT GENERATES THE ACTUAL TEST RESULTS

(75) Inventors: Kavita Kamani, Issaquah, WA (US); Randy A. Chapman, Renton, WA (US); Samuel D. Patton, III, Woodinville, WA (US); Francislav P. Penov, Bellevue, WA (US); Sujay Sahni, Sammamish, WA (US)

(73) Assignee: Microsoft Corporation, Remond, WA (US)

( * ) Notice: Subject to any disclaimer, the term of this patent is extended or adjusted under 35 U.S.C. 154(b) by 564 days.

(21) Appl. No.: 10/606,497

(22) Filed: Jun. 26, 2003

(65) Prior Publication Data

US 2005/0015666 A1   Jan. 20, 2005

(51) Int. Cl.
*G06F 11/00* (2006.01)
(52) U.S. Cl. .......................................... 714/38; 714/25
(58) Field of Classification Search .................. 714/25, 714/21
See application file for complete search history.

(56) References Cited

U.S. PATENT DOCUMENTS

| | | | | |
|---|---|---|---|---|
| 5,634,098 | A * | 5/1997 | Janniro et al. ................. | 714/38 |
| 6,223,306 | B1 * | 4/2001 | Silva et al. .................... | 714/37 |
| 2002/0053043 | A1 * | 5/2002 | Friedman et al. ............. | 714/25 |
| 2003/0131285 | A1 * | 7/2003 | Beardsley et al. ............ | 714/38 |
| 2003/0140138 | A1 * | 7/2003 | Dygon et al. ................ | 709/224 |
| 2003/0159089 | A1 * | 8/2003 | DiJoseph ...................... | 714/38 |
| 2004/0041827 | A1 * | 3/2004 | Bischof et al. ............. | 345/704 |
| 2004/0199818 | A1 * | 10/2004 | Boilen et al. .................. | 714/25 |
| 2004/0250243 | A1 * | 12/2004 | Banerjee et al. ............ | 717/134 |
| 2005/0015666 | A1 * | 1/2005 | Kamani et al. ................ | 714/25 |

OTHER PUBLICATIONS

High-Tech Dictionary Definition (system memory)—www.computeruser.com/resources/dictionary/definition.html-?lookup=4904.*
High-Tech Dictionary Definition (magnetic disk)—www.computeruser.com/resources/dictionary/definition.html-?lookup=2888.*

* cited by examiner

*Primary Examiner*—Yolanda L Wilson
(74) *Attorney, Agent, or Firm*—Workman Nydegger

(57) ABSTRACT

The present invention extends to methods, systems, and computer program products for isolating the evaluation of actual test results against expected test results from the test module that generates the actual test results. A results evaluation sub-system receives actual test results resulting from the execution of a test in a test environment. A results retrieval sub-system receives environmental data indicating that a test was performed in the test environment. The results retrieval sub-system selects one or more expected results from a results database based on the received environmental data. The results retrieval sub-system sends the selected one or more expected results to the results evaluation sub-system. The results evaluation sub-system receives the one or more selected results. The results evaluation sub-system evaluates the actual test results against the one or more expected results to determine if the test was successful.

36 Claims, 3 Drawing Sheets

ISOLATING THE EVALUATION OF ACTUAL TEST RESULTS AGAINST EXPECTED TEST RESULTS FROM THE TEST MODULE THAT GENERATES THE ACTUAL TEST RESULTS

BACKGROUND OF THE INVENTION

1. The Field of the Invention

The present invention relates to testing technology. More specifically, the present invention relates to isolating the evaluation of actual test results against expected test results from the test module that generates the actual test results.

2. Background and Related Art

Computers have revolutionized the way we work and play. There are an enormous variety of functions and applications that may be implemented by a general purpose computing system in response to the execution of a software application. The utility and functionality of the computing system does, however, rely on the proper coding of the source code that was compiled or interpreted into the binary instructions that are actually executed by the processor. If there is a coding error, this will often result in a deviation from expected functionality.

Extraordinary efforts are currently in place to reduce the number of unexpected performance deviations in many software programs before and after the software application are shipped to market. However, the creativity of software programmers and designers has led to increasingly complex and powerful software applications. As the complexity of the software application increases, so often does the number of lines of source code needed to generate the software application. As a result, a software application is often tested before release to the general public to help ensure that the software application operates as intended.

In some testing environments, a test developer develops tests that test the performance of one or more functions of a software application. For example, objects (methods, properties, classes, etc.) in a software application are often tested to attempt to identify combinations of input values that will cause output failures. One conventional method of testing software is to have a human tester (which may or may not be the software application programmer) manually analyze an object (or specification for the object) to identify input fields for the object. The tester then manual enters input field values to cause the object to generate an output (e.g., one or more output field values). The tester then determines if the test passes or fails based on the generated output.

However, manually analyzing a method (or specification) and manually inputting field values is time consuming and can introduce human error into the testing process. For example, if a tester enters an inappropriate input field value, the validity of generated output can be affected. Further, the time consumed to analyze and input field values for a number of interrelated objects, such as, for example, those of a software module or application, can be quite significant as each object must be individually analyzed and input field values manually generated for each method.

Accordingly, in part due to the inefficiencies of manual testing, automated testing programs have been developed. An automated test program essentially automates the entering of input field values, gathering of resulting output, and determining if a test passed or failed. Typically, a test developer with knowledge of an object to be tested develops an automated testing program to test the object. A test developer can use their knowledge of the object to test the object with input field values that are likely to expose deficiencies in or unintended operation of the object. Based on knowledge of the object the test developer can also identify the expected resulting output of the object. Thus, the test developer can configure the testing program to compare actual resulting output to expected resulting output and, based on the comparison, determine if an object is operating as intended.

A tester (which may or may not be the test developer) can then execute the test program to test the object. Executing the test program causes the test program to provide an indication of whether the test passed or failed (and thus whether the object is operating as intended). Unfortunately, automated test programs are typically configured to operate in a single environment. For example, a test developer may develop a test program for testing a word processor object in a first environment that includes a Windows operating system, a Pentium 3 processor, and has 128 MB system memory. Accordingly, when the test program is executed in this first environment, an indication of whether the word processor object passed or failed may be valid.

However, due to inevitable differences in both hardware and software components of a computer system, a test program designed to test the word processor object in one environment may not provide valid results in one or more other environments. Further, a test program may have no way to identify the test program's operating environment. For example, executing the test program in a second environment that includes a Unix operating system (or even a different version of the Windows operating system), a Pentium 4 processor, and/or 56 MB of memory, may provide different resulting output than the first environment. This different resulting output may be resulting output indicating that the word processor object is operating as intended in the second environment. However, since the different resulting output is not resulting output that indicates the word processor is operating as intended in the first environment, the test program may inappropriately indicate the word processor object is not operating as intended in the second environment.

To configure the test program to provide a valid pass/fail indication for the second environment, the test developer may be required to include new instructions in the test program. Further, as new environments are developed as a result of technological advances, the developer may also be required to develop additional instructions for these new environments. Thus, a test developer may be required to essentially continually maintain a test program when an object tested by the test program is used in new environments. Accordingly, what would be advantageous are mechanisms for evaluating test results that do not depend on the test module under execution generating the actual test results.

BRIEF SUMMARY OF THE INVENTION

The foregoing problems with the prior state of the art are overcome by the principles of the present invention, which are directed towards systems, methods, and computer program products for isolating the evaluation of actual test results against expected test results from the test module that generates the actual test results. In a test environment, a test module executes a test (e.g., to test the operation of a software module) that generates actual test results. The test module sends the actual test results to a results evaluation sub-system. The results evaluation sub-system receives the actual test results.

The test module may also identify one or more environmental conditions representing the test environment. In some embodiments, an environment discovery module identifies one or more other environmental conditions representing the test environment that are combined with any environmental conditions identified by the test module to create combined environmental data. The combined environmental data can be transferred along with the actual test results to the results evaluation sub-system, which then forwards the combined environmental data to a results retrieval sub-system. Alternately, combined environmental data is transferred directly to the results retrieval sub-system. The results retrieval sub-system receives environmental data (e.g., combined environmental data), indicating that a test was performed in the test environment.

The results retrieval sub-system selects one or more expected test results from a results database based on the received environmental data. Expected test results are results that are expected when a test is successful (e.g., prior results that are known to have indicated a successful test in the test environment). An additional type of result is a known failure result that can occur when a bug has previously been discovered in a software module.

While virtually an expected test results selection algorithm can be used, the results retrieval sub-system may compare received environmental data to environmental conditions stored in a results database. Based on the results of the comparison, the results retrieval sub-system can select one or more expected test results for the test environment. When there are no expected test results for the test environment, the results retrieval sub-system selects one or more expected test results that have an increased commonality with the test environment. For example, when not all environmental conditions match, the results retrieval sub-system may select expected test results for an environment that matches an increased number of (e.g., three of four) environmental conditions.

The results retrieval sub-system sends the one or more selected results to the results evaluation sub-system. The results evaluation sub-system receives the one or more expected test results from the results retrieval sub-system. The results evaluation sub-system evaluates the actual test results against the one or more expected test results to determine if the test was successful. While virtually any results evaluation algorithm can be used, the results evaluation sub-system may determine the successfulness of a test by comparing field values.

For example, the results evaluation sub-system can compare field values of the actual test results to field values of each of the one or more expected test results. If a threshold number of field values match, the results evaluation sub-system can indicate that the test was successful. When a threshold number of field values do not match, the actual test results can be further evaluated (potentially by a human tester). When appropriate, for example, when the actual test results where generated in a new test environment, the actual test results can be sent to the results retrieval sub-system. The results retrieval sub-system can include the actual test results in the results database.

The results evaluation sub-system can send evaluation results, for example, indicating environmental data and the outcome of the test to an analysis sub-system. The analysis sub-system can receive the evaluation results. The analysis sub-system can use the evaluation results to track historical deviation of the actual test results from expected test results, to generate reports, and to suggest additional test environments.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
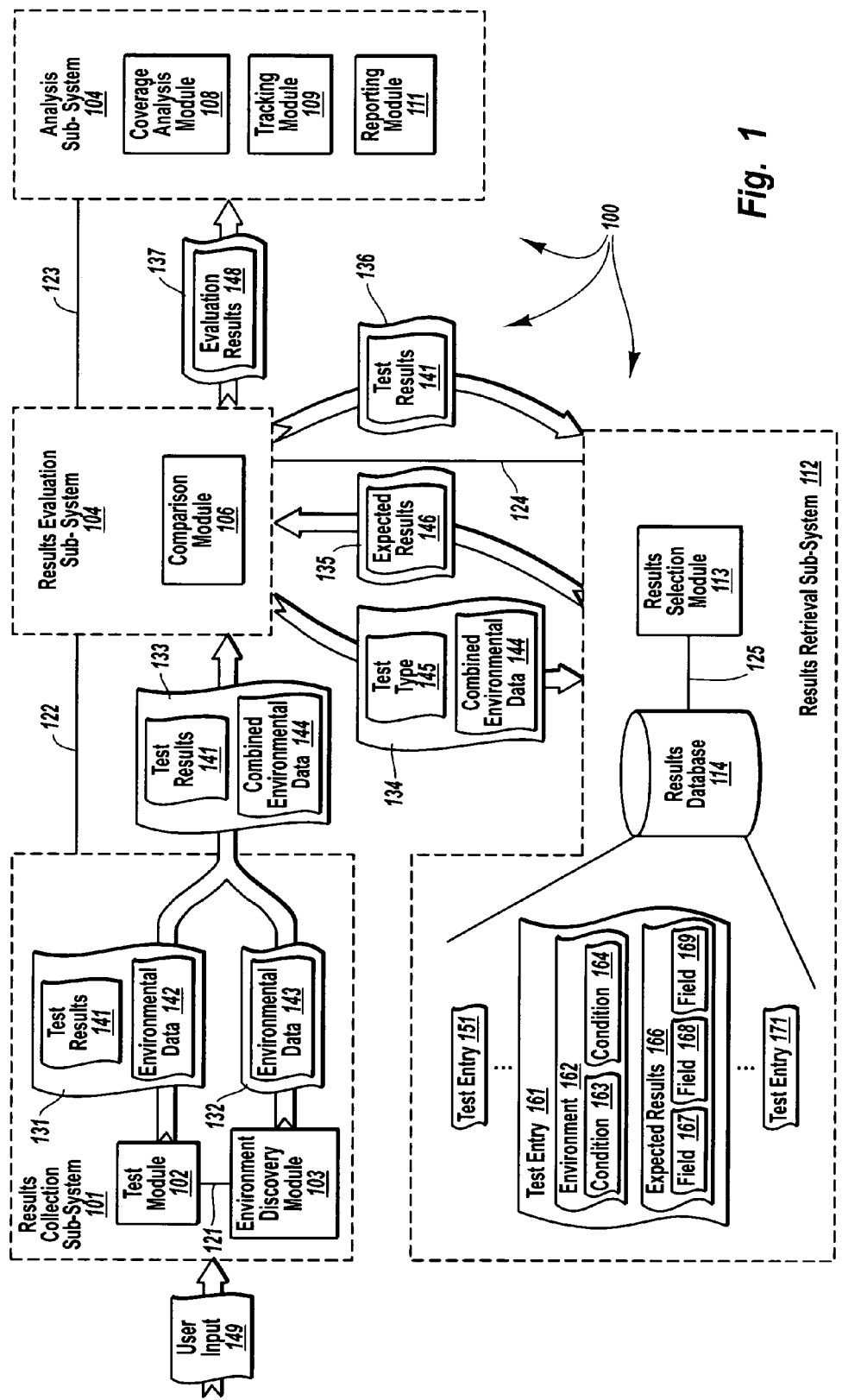
FIG. 1 illustrates an example of a computer architecture and associated modules and data structures that isolates the evaluation of actual test results against expected test results from the test module that generates the test results in accordance with the principles of the present invention.

The present invention extends to methods, systems, and computer program products for isolating the evaluation of actual test results against expected test results from the test module that generates the actual test results. A results evaluation sub-system receives actual test results resulting from the execution of a test in a test environment. A results retrieval sub-system receives environmental data indicating that a test was performed in the test environment. The results retrieval sub-system selects one or more expected test results from a results database based on the received environmental data. The results retrieval sub-system sends the selected one or more expected test results to the results evaluation sub-system. The results evaluation sub-system receives the one or more expected test results. The results evaluation sub-system evaluates the actual test results against the one or more expected test results to determine if the test was successful.

Embodiments of the present invention may comprise a special purpose or general-purpose computer including various computer hardware and software, as discussed in greater detail below. In particular, embodiments within the scope of the present invention include computer-readable transmission or storage media for carrying or having computer-executable instructions or data structures stored thereon. Such computer-readable media can be any available media that can be accessed by a general purpose or special purpose computer. By way of example, and not limitation, such computer-readable storage media can comprise RAM, ROM, EEPROM, CD-ROM or other physical storage media, such as optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable transmission medium. Thus, any such connection is properly termed a computer-readable transmission medium. Combinations of the above should also be included within the scope of computer-readable transmission media. Computer-executable instructions comprise, for example, instructions and data which cause a general purpose computer, special purpose computer, or special purpose processing device, such as a GPU, to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced with many types of computer system configurations, including, personal computers, laptop computers, multi-processor systems, minicomputers, mainframe computers, and the like. The invention may also be practiced in distributed system environments where local and remote computer systems, which are linked (either by hardwired links, wireless links, or by a combination of hardwired and wireless links) through a network, both perform tasks. In a distributed system environment, program modules and associated data structures may be located in both local and remote memory storage devices.

Turning now to FIG. 1, FIG. 1 illustrates an example of computer architecture 100 and associated modules and data structures isolating the evaluation of actual test results against expected test results from the test module that generates the actual test results in accordance with the principles of the present invention. The rectangular elements in computer architecture 100 (e.g., environment discovery module 103, comparison module 106, and results selection module 113) represent executable modules that facilitate determining the successfulness of a test (e.g., executed at test module 102). The scrolled elements (e.g., test results 141, combined environmental data 144, and test 161) represent data that is processed by the executable modules to determine the successfulness of the test. Accordingly, the executable modules and scrolled elements depicted in computer architecture 100 cooperatively interact to implement the principles of the present invention.

Within computer architecture 100, results collection sub-system 101 is connected to results evaluation sub-system 104, analysis sub-system 107 is connected to results evaluation sub-system 104, and results retrieval sub-system 112 is connected to results evaluation sub-system 104 by corresponding links 122, 123, and 124 respectively. Links 122, 123, and 124 can include portions of a system bus, a local area network ("LAN"), a wide area network ("WAN"), and/or even the Internet. Thus, it may be that each of the sub-systems depicted in computer architecture 100 are included in the same computer system (e.g., when links 122, 123, and 124 are included in a system bus). On the other hand, it may also be that one or more of the sub-systems depicted in computer architecture 100 are included in different computer systems (e.g., when links 122, 123, and/or 124 include portions of a LAN, WAN, or the Internet).

The sub-systems depicted in architecture 100 can communicate by exchanging electronic messages over the depicted corresponding links. Communication between sub-systems can include interprocess and/or network communication using a wide variety of protocols. When sub-systems are included in the same computer system they may communicate using bus protocols, such as, for example, RS 232, Universal Serial Bus, Firewire, etc. When sub-systems are network connectable they may communicate using network protocols, such as, for example, Ethernet, Internet Protocol ("IP"), Transmission Control Protocol ("TCP"), etc. Electronic messages depicted in computer architecture 100 (e.g., message 133) may be electronic messages that are transferred in accordance with bus and/or network protocols.

Test module 102 and environment discovery module 103 are connected by corresponding link 121, which can also include portions of a system bus, a LAN, a WAN, and/or even the Internet. Test module 102 can collect actual test results from a test that was executed in a test environment. Test module 102 can collect actual test results automatically or in response to user-input (e.g., user input 149). In some embodiments, test module 102 may execute a test and then collect the actual test results of the test. For example, test module 102 may submit test input to a software object (e.g., by submitting values for one or more input fields) and then collect actual test results from the software object (e.g., by collecting the values for one or more output fields). In other embodiments, test module 102 collects actual test results output by other test modules. For example, test module 102 may collect actual test results generated at a test module facilitating an automobile crash test or a test module facilitating testing a robotic arm. Test module 102 can be connected to other test modules by appropriate links.

Test module 102 can also collect environmental data for test environments. For example, test module 102 may collect computer system environment data, such as, for example, an operating system, processor, and/or system memory type included in a computer system that executed a test. Test module 102 may also delegate the collection of additional environmental data to environment discovery module 103. When test module 102 is to collect test results for a test, test module 102 can send an instruction (e.g., an electronic message) to environment discovery module 103 instructing environment discovery module 103 to discovery environmental data associated with a corresponding test environment.

For example, when test module 102 is to collect automobile crash test results, test module 102 may instruct environment discovery module 103 to discovery the temperature, humidity, and other physical environmental data, at the time the automobile crash test occurred. Accordingly, environment discovery module 103 may receive input from one or more sensors, such as, for example, a thermometer, a speedometer, a hygrometer, a barometer, etc. When testing a software module, environment discovery module 103 may discovery computer system environmental data, such as, for example, operating system, drivers, component types, processor, etc. Results collection sub-system 101 can combine environmental data from test module 102 (e.g., environmental data 142) and environment discovery module 103 (e.g., environmental data 143) into combined environmental data (e.g., combined environmental data 144).

Results selection module 113 and results database 114 are connected by corresponding link 125, which can include portions of a system bus, a LAN, WAN, and/or even the Internet. Results selection module 133 can receive environmental data (e.g., combined environmental data 144) along with an indication of a test type (e.g., test type 145). Received environmental data can be environmental data that was collected by a test module and/or an environment discovery module. A test type indicator can provide an indication of the type of test (e.g., testing a software module, a robot, etc.) that was executed in the test environment represented by receive environmental data.

In response to reception of environmental data and/or a test type indicator, results selection module 113 can select appropriate expected test results from results database 114, which includes expected test results for one or more different tests. It may be that results database 114 includes a plurality of expected test results for the same test executed in different test environments. For example, test entry 151, test entry 161, and test entry 171 may all refer to the same test (e.g., testing the operation of a software method) executed in different test environments (e.g., different operating system, different network interface, different video driver, etc.). A series of three vertical periods (a vertical ellipsis) indicates that other test entries (for the same and/or different tests) can be included in results database 114.

Within results database 114, expected test results for a test can be keyed by environmental conditions representing a test environment. For example, test entry 161 can be keyed by condition 163 and/or condition 164. When results selection module 113 receives environmental data representing a test environment, results selection module 133 can attempt to identify appropriate expected test results from test entries in results database 114. In some embodiments, results selection module 133 utilizing a matching algorithm to attempt to match received environmental data (e.g., combined environmental data 144) to environmental conditions in a test entry (e.g., condition 163 and/or condition 164). When a match is identified, results selection module 113 can select corresponding expected test results from the test entry. For example, results selection module 113 can identify that combined environmental data 144 matches conditions 163 and 164. Accordingly, results selection module 113 can select expected results 166.

It may be that a test has a plurality of expected test results that indicate the test was successful in a particular test environment. Thus, received environmental data may match a plurality of test entries in results database 141. For example, combined environmental data 144 may match environmental conditions included in both test entry 151 and test entry 171. Accordingly, results selection module 113 can select corresponding expected test results from both test entry 151 and test entry 171.

When a test is executed in a new test environment, results selection module 113 can select one or more appropriate expected test results. Results selection module can select expected test results from environments that have increased commonality with the new test environment. For example, results database 114 may store a first test entry for a software method test executed in an Intel Pentium 3 processor environment and a second test entry for the software method test executed in a Motorola G4 processor environment. Subsequently, it may be that results selection module 113 receives environmental data indicating that the software method test was executed in an Intel Pentium 4 processor environment.

Accordingly, since a Pentium 4 processor environment can be viewed as having increased commonality to the Pentium 3 processor environment, selection module 113 can select expected test results from the Intel Pentium 3 processor environment test entry as the expected test results for the Intel Pentium 4 processor environment. When a plurality of test entries have increased commonality with received environmental data representing a new test environment, results selection module 113 can select a corresponding plurality of expected test results from results database 114. Accordingly, results selection module 113 may be able to predict expected test results for a new test environment.

In some embodiments, results selection module 113 receives one or more portions of environmental data that "must-match" environmental conditions in results database 114. Reception of must-match environmental data can indicate that only known expected test results, from an environment having environmental conditions that match the must-match environmental data, are to be selected. For example, received environmental data can include a must-match environmental condition indicating that only expected test results from Unix environments are to be selected. Accordingly, received environmental data having increased commonality to other environmental conditions (even environmental data that matches a plurality of other environmental conditions) but that are not Unix environments will not be selected. Use of must-match environmental data can be particularly advantageous when non-matching values for a particular environmental condition would have reduced meaning. For example, when testing a software method of the Unix operating system, expected test results from other operating system environments may have little meaning.

In other embodiments, expected test results are actions, such as, for example, a macro, that generate the expected test results. For example, field 167 may contain computer-executable instructions of a macro that can generate an expected field value. Alternately, an expected test results field can include a reference (e.g., a Uniform Resource Identifier ("URI")) to a module that can generate the expected test results. For example, field 168 may contain a URI referencing a module that can generate an expected field value. In response to selecting test entry 161, results selection module 113 can access the URI to cause the expected test results for field 168 to be generated.

Selected expected test results can include one or more field values. Field values can be of virtually any data type, such as, for example, Boolean, integer, floating point, character, string, complex, or even user-defined data types. For example, field 167 may contain a Boolean value, field 168 may contain a string value, and field 169 a user-defined data structure. Although the operation of results selection module 113 has been described with respect to a matching algorithm, other algorithms, in addition to matching algorithms, can be used to select expected test results from results database 114.

Results retrieval sub-system 112 can send expected test results to results evaluation sub-system 104. Results evaluation sub-system 104 can evaluate actual test results against expected test results to determine if a test was successful. For example, comparison module 106 can compare field values in actual test results to field values in expected test results to determine if the values of one or more field values match. Comparison module 106 can be configured such that when a threshold number (e.g., some or all) actual field values match expected field values a test is indicated as being successful.

A match may result when an actual field value and an expected field value are equivalent. For example, an actual field value of −5 may match an expected field value of −5. Alternately, a match may results when an actual field value is within a range specified by an expected field value. For example, an actual humidity value of 40% may match an expected humidity value of less than 70%.

Results evaluation sub-system 104 can also be configured to check that a test performed particular actions. A Boolean value of "TRUE" can indicate to results evaluation sub-system 104 that an action was (or was to be) performed. For example, a TRUE value received in actual test results (e.g., test results 141) can indicate that a test performed an action (e.g., a robotic arm lifted a cargo crate). A TRUE value in expected test results (e.g., expected results 146) can indicate that a successful test is to perform an action. Comparison module 106 can compare Boolean values in actual test results to Boolean values in expected test results to determine if a test performed an action.

Results evaluation sub-system 104 can be configured to determine if actions were performed in a specified order. For example, for a test to be successful it may that a robotic arm is to perform action A before action B and is to perform action B before action C. Accordingly, for the test to be successful the actions could be performed in the following order: action A, then action B, then action C. If actual test results indicate that the actions were performed in the order: action B, then action A, then action C, (or one or more of the actions was not performed at all) results evaluation sub-system 104 would indicate that the test did not succeed.

Results evaluation sub-system can also be configured to check unordered actual test results. For example, for a test to be successful it may be that actions D, E, and F are performed. However, the order of perform of actions D, E, and F is of little, if any, importance. For example, to indicate a successful test a software method may be required to update the values of three variables before a timer expires. However, the order of updating the three variables may have little importance. Accordingly, for the test to be successful each of the actions D, E, and F, would have to be performed. If actual test results indicate that each of the actions D, E, and F, were not performed, results evaluation sub-system 104 would indicate that the test did not succeed.

Results evaluation sub-system can also be configured to check actual test results having some ordered results and some unordered results (which may be referred to as "mixed results"). When results evaluation sub-system 104 indicates that a test has not succeeded, actual test results can be further evaluated (potentially by a human tester with knowledge of the test and/or the test environment). When appropriate, for example, when actual test results result from executing a test in a new test environment, the actual test results can be sent to results retrieval sub-system 112. Results retrieval sub-system 112 can include the actual test results in results database 114 such that the actual test results become expected test results for use in determining the successfulness of subsequently executed tests. Results evaluation sub-system 104 can also send evaluation results, for example, indicating environmental data and indicating if the test was successful to analysis sub-system 107.

Analysis sub-system 107 can receive evaluation results from results evaluation sub-system 104. Analysis sub-system 107 can use the evaluation results to track historical deviation of the actual test results from expected test results, to generate reports, and to suggest additional test environments. For example, coverage analysis module 108 can, based on the coverage of a test, generate a set of environmental conditions that would maximize the coverage of the test for changes in a tested product. Tracking module 109 can use expected test results as baselines and track historical deviations of actual test results from excepted test results. Reporting module 111 can generated automated reports that indicate environmental conditions that tend to cause a test to fail and can suggest sets of environmental conditions that have an increased likelihood of resulting in failures (and thus that should under go more scrupulous testing).

Figure 2:
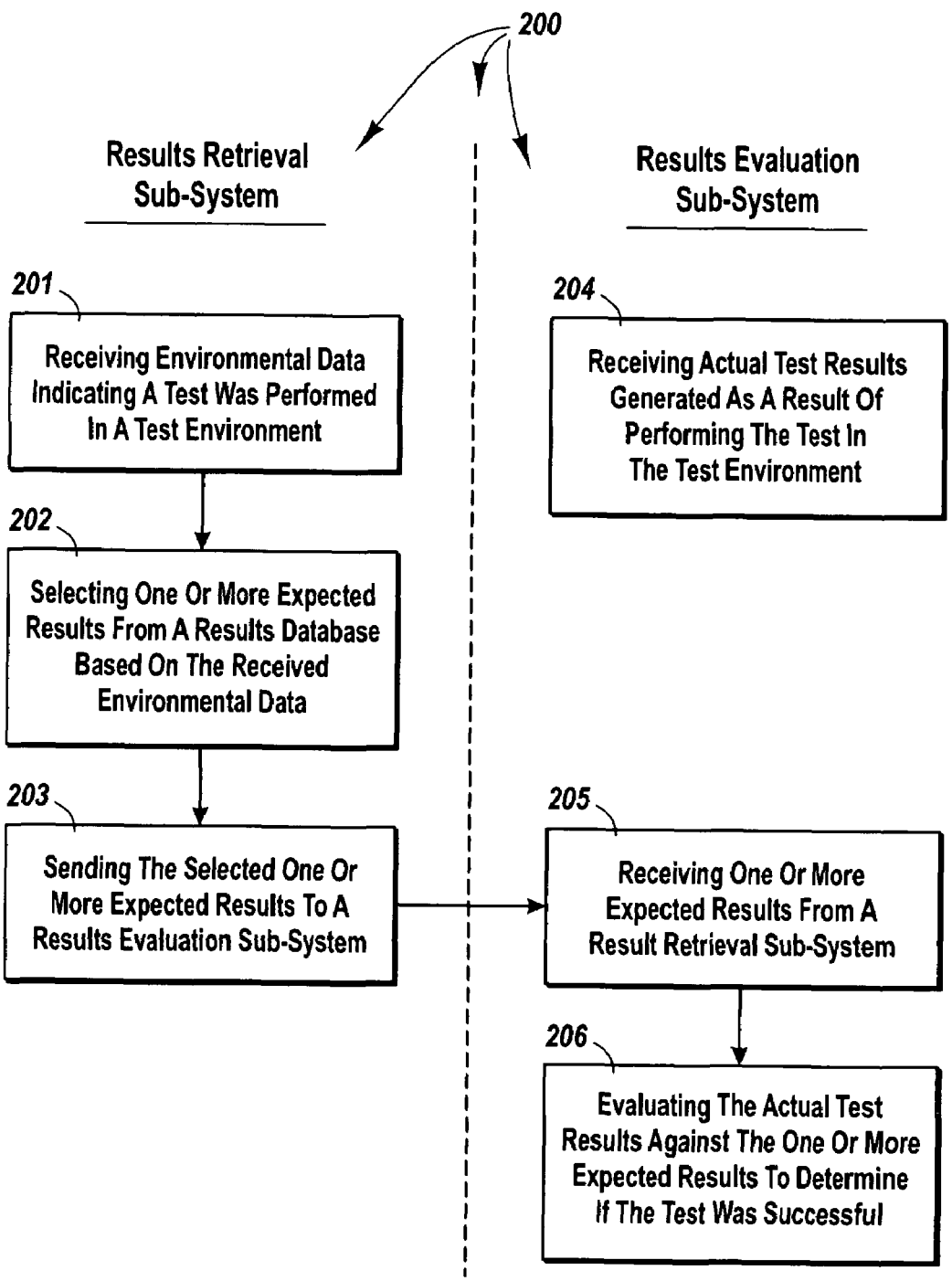
FIG. 2 illustrates a flowchart of a method for isolating the evaluation of actual test results against expected test results from the test module that generates the actual test results in accordance with the principles of the present invention

FIG. 2 illustrates a flowchart of a method for isolating the evaluation of actual test results against expected test results from the test module that generates the actual test results in accordance with the principles of the present invention. The method 200 will be discussed with respect to the sub-systems depicted in computer architecture 100. The method 200 includes an act of receiving actual test results generated as a result of performing a test in a test environment (act 204). Act 204 can include a results evaluation sub-system receiving results generated as a result of performing a test in a test environment. For example, results evaluation sub-system 104 can receive message 133, which includes test results 141, from results collection sub-system 101.

Test results 141 can be actual test results from a test executed by test module 102. Alternately, test results 141 can be actual test results from a test executed external to results collection sub-system 101. However, results collection sub-system 101 can collect test results 141 whether test results 141 are generated by test module 102 or generated external to results collection sub-system 101. Test results 141 can include one or more field values that were output as a result of executing a test.

The method 200 includes an act of receiving environmental data indicating that a test was performed in the test environment (act 201). Act 201 can include a results retrieval sub-system receiving environmental data indicating that a test was performed in a test environment. For example, results retrieval sub-system 112 can receive message 134, which includes test type 145 and combined environmental data 144, from results evaluation sub-system 104. Alternately, results retrieval subsystem 112 can receive combined environmental data 144 from results collection sub-system 101. For example, results collection sub-system 101 can send a message including test results 141 to results evaluation sub-system 104 and can send a separate message including combined environmental data 144 to results retrieval sub-system 112. Combined environmental data 144 can include one or more environmental conditions that represent the test environment.

The method 200 includes an act of selecting one or more expected results from a results database based on the received environmental data (act 202). Act 202 can include a results retrieval sub-system selecting one or more expected results from a results database based on the received environmental data. Results selection module 113 can appropriately select expected results from one or more test entries included in results database 114 based on combined environmental data 144. For example, when environmental data 144 includes conditions that match conditions 163 and 164, results selection module 113 can select expected results 166. Each selected expected results can include one or more field values that if included in actual test results may indicate a successful test. For example, when actual test results 141 include field values matching the values of field 167, field 168, and field 169, the test that generated actual test results 141 may be indicated as a success.

Another type of result is a known failure result. A known failure result can occur due to a bug that has been previously discovered in a software module. When an actual test result matches a known failure result, a results comparison can indicate the actual test results as a known failure. Indicating actual test results as a known failure is beneficial in preventing a human tester from having to determine why an error occurred.

The method 200 includes an act of sending the selected one or more expected results to a results evaluation sub-system (act 203). Act 203 can include a results retrieval sub-system sending the selected one or more expected results to a results evaluation sub-system in response to receiving the environmental data. For example, results retrieval sub-system 112 can send message 135, which includes expected results 146, to results evaluation sub-system 104 in response to receiving combined environmental data 144. Expected results 146 may include a field values form a plurality of appropriate expected results retrieved from results database 114. For example, expected results 146 can include expected results 166 as well as expected results from test entries 151 and 171. Accordingly, it may be that a there are a plurality of expected results indicating a test was successful.

The method 200 includes an act of receiving one or more expected results from a results retrieval sub-system (act 205). Act 205 can include a results evaluation sub-system receiving one or more expected results from a results retrieval sub-system. For example, results evaluation sub-system 104 can receive message 135, which includes expected results 146, from results retrieval sub-system 112. Each of the expected results in expected results 146 can be expected results that may occur when the test is successful in the test environment.

The method 200 includes an act of evaluating the actual test results against the one more expected test results to determine if the test was successful (act 206). Act 206 can include a results evaluation sub-system evaluating the actual test results against one or more expected test results to determine if the test was successful in the test environment. Comparison module 106 can compare test results 141 to expected results 146 to determine if a test executed by test module 102 was successful. For example, comparison module 106 can compare field values in test results 141 to field values in expected results 146. If field values from test results 141 match field values for any test entries in expected results 146 (e.g., fields 167, 168, and 169 from test entry 161), the test that generated test results 141 can be viewed as successful.

When test results 141 do not indicate a successful test in view of expected test results 146, test results 141 an be further evaluated, for example, by a test developer with knowledge of the test and/or the test environment. When appropriate, for example, when a test is executed in a new test environment, test results 141 can be sent to results retrieval sub-system 112 for inclusion in results database 114. For example, results evaluation sub-system 104 can send message 136, which includes test results 141, to results retrieval sub-system 112. Results retrieval sub-system can insert test results 141 as well as appropriate environmental conditions representing the test environment in which test result s141 were generated into results database 114. Accordingly, test results 141 may be used as expected test results to determine the successfulness of subsequently executed tests.

Since results evaluation sub-system 104 and results retrieval sub-system 112 operate external to testing modules (e.g., test module 102) that generate actual test results, test environment changes do not necessarily result in a test module having to be modified when a test environment changes. This potentially relieves a test developer from having to modify an existing test module to appropriately execute a test in new test environments. Thus, test development resources are conserved and can be used more appropriately, such as, for example, to develop new tests. Further, through the incorporation of actual test results into a results database, the potential for appropriately predicting expected test results when tests are executed in new environments is increased.

After determining the outcome of a test, results evaluation sub-system 104 can send evaluation results to analysis sub-system 107. For example, results evaluation sub-system 104 can send message 137, which includes evaluation results 148, to analysis sub-system 107. Evaluation results 148 can include test results 141, expected results 146, combined environmental data 144, and an indication of whether the test that generated test results 141 in an environment represented by combined environmental data 144 was successful.

Analysis sub-system 107 can receive evaluation results 148 and use evaluation results 147 to track historical deviation of actual test results for a test from expected test results for the test, to generate reports associated with the test, and to suggest additional test environments in which to execute the test. For example, coverage analysis module 108 can, based on the coverage of the test that generated test results 141, generate a set of environmental conditions that would maximize the coverage of the test for changes in a tested product. Tracking module 109 can use expected results 146 as a baseline and track historical deviations of actual test results from excepted results 146. Reporting module 111 can generated automated reports that indicate environmental conditions that may tend to cause the test that generated test results 141 to fail and can suggest sets of environmental conditions that have an increased likelihood of resulting in failures (and thus that should under go more scrupulous testing).

Figure 3:
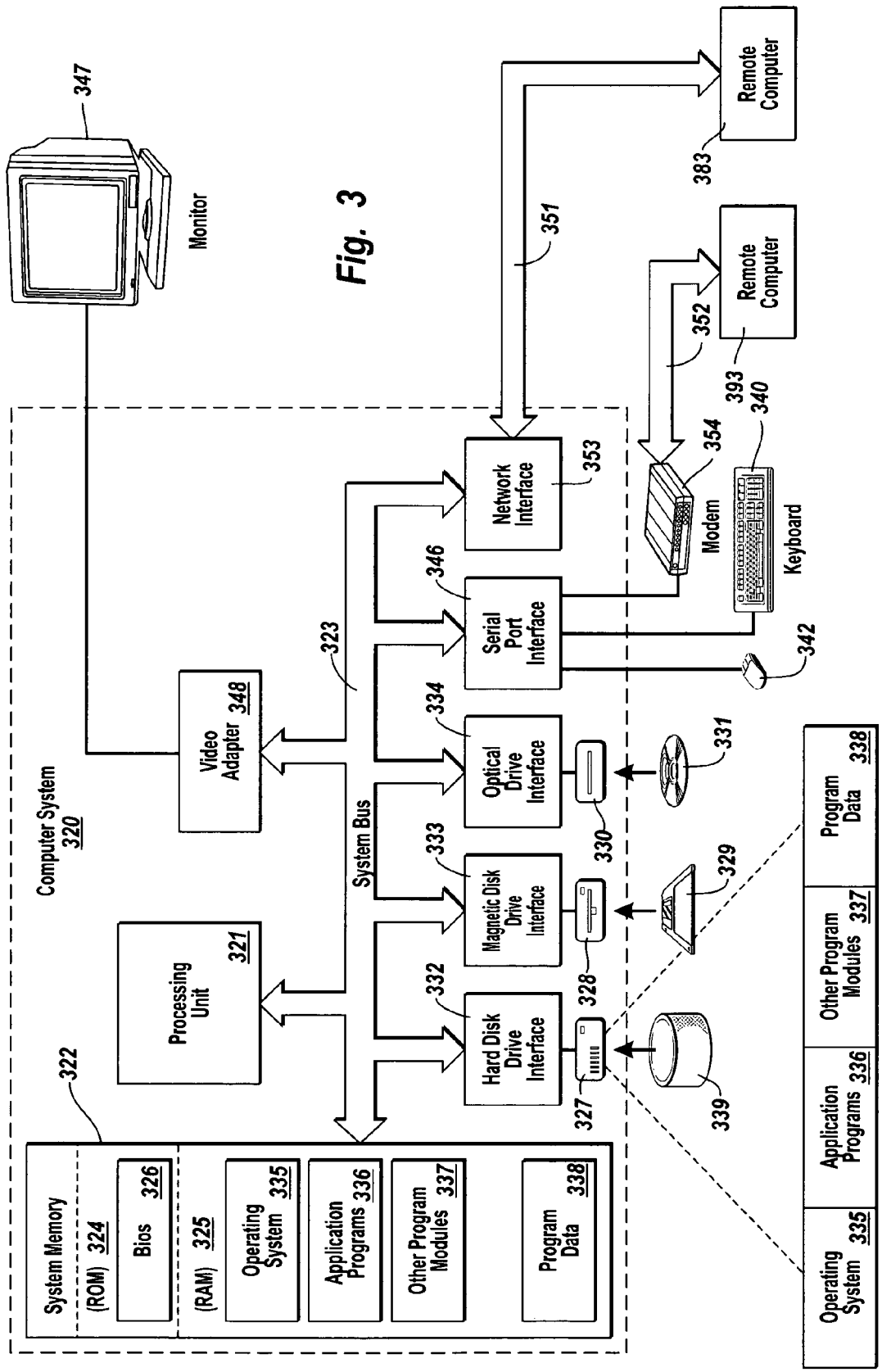
FIG. 3 illustrates a suitable operating environment for the principles of the present invention.

FIG. 3 illustrates a suitable operating environment for the principles of the present invention. FIG. 3 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 3, an example system for implementing the invention includes a general-purpose computing device in the form of computer system 320, including a processing unit 321, a system memory 322, and a system bus 323 that couples various system components including the system memory 322 to the processing unit 321. Processing unit 321 can execute computer-executable instructions designed to implement features of computer system 320, including features of the present invention. The system bus 323 may be any of several types of bus structures including a memory bus or memory controller, a peripheral bus, and a local bus using any of a variety of bus architectures. The system memory includes read only memory ("ROM") 324 and random access memory ("RAM") 325. A basic input/output system ("BIOS") 326, containing the basic routines that help transfer information between elements within the computer 320, such as during start-up, may be stored in ROM 324.

The computer system 320 may also include a magnetic hard disk drive 327 for reading from and writing to a magnetic hard disk 339, a magnetic disk drive 328 for reading from or writing to a removable magnetic disk 329, and an optical disk drive 330 for reading from or writing to removable optical disk 331, such as, or example, a CD-ROM or other optical media. The magnetic hard disk drive 327, magnetic disk drive 328, and optical disk drive 330 are connected to the system bus 323 by hard disk drive interface 332, magnetic disk drive-interface 333, and optical drive interface 334, respectively. The drives and their associated computer-readable media provide nonvolatile storage of computer-executable instructions, data structures, program modules, and other data for computer system 320. Although the example environment described herein employs a magnetic hard disk 339, a removable magnetic disk 329 and a removable optical disk 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disk 331, ROM 324 or RAM 325, including an operating system 335, one or more application programs 336, other program modules 337, and program data 338. A user may enter commands and information into the computer system 320 through keyboard 340, pointing device 342, or other input devices (not shown), such as, for example, a microphone, joy stick, game pad, scanner, or the like. These and other input devices can be connected to the processing unit 321 through serial port interface 346 coupled to system bus 323. Alternatively, input devices can be connected by other interfaces, such as, for example, a parallel port, a game port, a universal serial bus ("USB") port, or a Fire Wire port. A monitor 347 or other display device is also connected to system bus 323 via video adapter 348. Computer system 320 can also be connected to other peripheral output devices (not shown), such as, for example, speakers and printers.

Computer system 320 is connectable to networks, such as, for example, an office-wide or enterprise-wide computer network, an intranet, and/or the Internet. Computer system 320 can exchange data with external sources, such as, for example, remote computer systems, remote applications, and/or remote databases over such a network.

Computer system 320 includes network interface 353, through which computer system 320 receives data from external sources and/or transmits data to external sources. As depicted in FIG. 3, network interface 353 facilitates the exchange of data with remote computer system 383 via link 351. Link 351 represents a portion of a network, and remote computer system 383 represents a node of the network. For example, remote computer system 383 may include a results retrieval sub-system that provides expected results to and receives results updates from a results evaluation sub-system at computer system 320. On the other hand, computer system 383 may include a results evaluation sub-system that receives expected results from and sends results updates to a results retrieval sub-system at computer system 320.

Likewise, computer system 320 includes serial port interface 346, through which computer system 320 receives data from external sources and/or transmits data to external sources. Serial port interface 346 is coupled to modem 354, through which computer system 320 receives data from and/or transmits data to external sources. Alternately, modem 354 can be a Data Over Cable Service Interface Specification ("DOCSIS") modem or digital subscriber lines ("DSL") modem that is connected to computer system 320 through an appropriate interface. However, as depicted in FIG. 3, serial port interface 346 and modem 354 facilitate the exchange of data with remote computer system 393 via link 352. Link 352 represents a portion of a network, and remote computer system 393 represents a node of the network. For example, remote computer system 393 may include a results collection sub-system that sends actual test results and environmental data to a results evaluation sub-system at computer system 320. On the other hand, computer system 393 may include a results evaluation sub-system that receives actual test results and environment data from a results collection sub-system at computer system 320.

While FIG. 3 represents a suitable operating environment for the present invention, the principles of the present invention may be employed in any system that is capable of, with suitable modification if necessary, implementing the principles of the present invention. The environment illustrated in FIG. 3 is illustrative only and by no means represents even a small portion of the wide variety of environments in which the principles of the present invention may be implemented.

Modules of the present invention, as well as associated data, can be stored and accessed from any of the computer-readable media associated with computer system 320. For example, portions of such modules and portions of associated program data may be included in operating system 335, application programs 336, program modules 337 and/or program data 338, for storage in system memory 322. When a mass storage device, such as, for example, magnetic hard disk 339, is coupled to computer system 320, such modules and associated program data may also be stored in the mass storage device. In a networked environment, program modules and associated data depicted relative to computer system 320, or portions thereof, can be stored in remote memory storage devices, such as, for example, system memory and/or mass storage devices associated with remote computer system 383 and/or remote computer system 393. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a computer system that includes a results evaluation sub-system for evaluating test results generated by a test of an object that typically produces different resulting output for different test environments, a method for creating consistent evaluation of the object across multiple testing environments without having to generate or maintain new or additional test instructions for varying environments, the method comprising the following:

an act of receiving actual test results, the actual test results being generated as a result of performing a test in a test environment;

an act of receiving environmental data that defines the test environment under which the actual test results are generated;

in response to receiving environmental data when attempting to find a match therewith, an act of comparing the received environmental data with a set of test entry environments stored in a results retrieval sub-system, wherein each test entry environment of the set corresponds to a particular environment for which the test was previously executed;

based on the comparing, an act of selecting a specific test entry environment from among the set of test entry environments stored in the results retrieval sub-system, wherein one or more environmental conditions for the selected specific test entry environment have increased commonality with one or more environmental conditions of the environmental data;

based on the selection of the specific test entry environment, an act of identifying one or more expected test results from the results retrieval sub-system, the identified one or more expected test results being keyed to the selected specific test entry environment and resulting from one or more of previous executions of the test in the specific test entry environment; and an act of evaluating the actual test results against the identified one or more expected test results to determine if the test was successfully performed in the test environment.

2. The method as recited in claim 1, wherein the act of receiving actual test results comprises an act of receiving actual test results that were collected at a results collection sub-system.

3. The method as recited in claim 1, wherein the act of receiving actual test results comprises an act of receiving actual test results from a test module that generated the actual test results.

4. The method as recited in claim 1, wherein the act of receiving actual test results comprises an act of receiving actual test results generated from testing a software object.

5. The method as recited in claim 1, wherein at least one of the one or more environmental conditions must-match at least one of the one or more environmental conditions of the selected specific test entry environment.

6. The method as recited in claim 1, wherein the one or more expected test results are received from a results retrieval sub-system, and wherein the one or more expected test results indicate the test was successfully executed in the test environment defined by the environmental data.

7. The method as recited in claim 1, wherein the one or more expected test results are received using a network message from a second computer system that includes the results retrieval sub-system, the second computer system being network connectable to the computer system.

8. The method as recited in claim 1, wherein the act of evaluating the actual test results against the one or more expected test results comprises an act of comparing field values in the actual test results to field values in the expected test results.

9. The method as recited in claim 1, wherein the act of evaluating the actual test results against the one or more expected test results comprises an act of determining if one or more actions were performed.

10. The method as recited in claim 9, wherein the act of determining if one or more actions were performed comprises an act of determining if one or more actions were performed in a specified order.

11. The method as recited in claim 1, further comprising:
an act of sending the environmental data along with a test type indication to the results retrieval sub-system for determining if a match exists between the one or more environmental conditions of environmental data and the one or more environmental conditions of the selected specific test entry environment.

12. The method as recited in claim 11, wherein the act of receiving environmental data that defines the test environment under which actual test results are generated comprises an act of receiving environmental data from an environment discovery module.

13. The method as recited in claim 11, wherein the act of receiving environmental data that defines the test environment under which actual test results are generated comprises an act of receiving environmental data from a test module that executed the test.

14. The method as recited in claim 1, further comprising:
an act of sending a results update to the results retrieval sub-system, the results update including at least the actual test results.

15. The method as recited in claim 1, fUrther comprising:
an act of sending evaluation results to an analysis sub-system, the evaluation results including at least the actual test results and an indication of whether the test was successful.

16. In a computer system that includes a results retrieval sub-system for retrieving expected results of a test of an object that typically produces different resulting output for different test environments, a method for creating consistent evaluation of the object across multiple testing environments without having to generate or maintain new or additional test instructions for varying environments by retrieving expected results that are to be used to determine if a test was sucessful, the method comprising the following:

receiving environmental data that defines a test environment under which actual test results are generated indicating that a test was performed in the test environment;

in response to receiving environmental data when attempting to find a match therewith, comparing the received environmental data with a set of test entry environments stored in a database, wherein each test entry environment of the set corresponds to a particular environment for which the test was previously executed;

based on the comparing, selecting a specific test entry environment from among the set of test entry environments stored in the database, wherein one or more environmental conditions for the selected specific test entry environment have increased commonality with one or more environmental conditions of the environmental data;

based on the selection of the specific test entry environment, identifying one or more expected test results from a results database, the identified one or more expected test results being keyed to the selected specific test entry environment and resulting from one or more of previous executions of the test in the specific test entry environment; and sending the identified one or more expected test results to a results evaluation sub-system in response to receiving the environmental data to determine if the test was successfully performed in the test environment.

17. The method as recited in claim 16, wherein the act of receiving environmental data that defines a test environment comprises an act of receiving environmental data from a results collection sub-system.

18. The method as recited in claim 16, wherein the act of receiving environmental data that defines a test environment under which actual test results are generated comprises an act of receiving environmental data from a results evaluation sub-system.

19. The method as recited in claim 16, wherein the act of receiving environmental data that defines a test environment under which actual test results are generated comprises an act of receiving environmental data that represents the test environment.

20. The method as recited in claim 16, wherein the act of receiving environmental data that defines a test environment under which actual test results are generated comprises an act of receiving environmental data from a second computer system that includes the results evaluation sub-system, the second computer system being network connectable to the computer system.

21. The method as recited in claim 16, wherein the act of receiving environmental data that defines a test environment under which actual test results are generated comprises an act of receiving a test type along with the environmental data, the test type indicating a specified type of test was executed in an environment represented by the environmental data.

22. The method as recited in claim 21, wherein the act of receiving a test type along with the environmental data, the test type indicating a specified type of test was executed in an environment represented by the environmental data comprises receiving an indication that a software object was tested in an environment represented by the environmental data.

23. The method as recited in claim 16, wherein the database that stores the set of test entry environments is the same as the results database.

24. The method as recited in claim 16, wherein at least one of the one or more environmental conditions for the selected specific test entry environment must-match at least one of the one or more environmental conditions for the received environmental data.

25. The method as recited in claim 16, wherein the act of identifying one or more expected results from a results database based on the received environmental data comprises an act of selecting a plurality of expected results from the results database.

26. The method as recited in claim 16, farther comprising:
an act of receiving a results update from the results evaluation sub-system, the results update included actual test results from a test executed in a new test environment; and
an act of storing the actual results in the results database such that the actual results can be used to determine successfulness of subsequently executed tests.

27. A computer program product for use in a computer system that includes a results evaluation sub-system for evaluating test results generated by a test of an object that typically produces different resulting output for different test environments, the computer program product for implementing a method for creating consistent evaluation of the object across multiple testing environments without having to generate or maintain new or additional test instructions for varying environments, the computer program product comprising one or more computer-readable storage media having stored thereon computer executable instructions that, when executed by a processor, cause the computer system to perform the following:
receive actual test results, the actual test results being generated as a result of performing a test in a test environment;
receive environmental data that defines the test environment under which the actual test results are generated;
in response to receiving environmental data when attempting to find a match therewith, compare the received environmental data with a set of test entry environments stored in a results retrieval sub-system, wherein each test entry environment of the set corresponds to a particular environment for which the test was previously executed;
based on the comparing, select a specific test entry environment from among the set of test entry environments stored in the results retrieval sub-system, wherein one or more environmental conditions for the selected specific test entry environment have increased commonality with one or more environmental conditions of the environmental data;
based on the selection of the specific test entry environment, identify one or more expected test results from the results retrieval sub-system the identified one or more expected results being keyed to the selected specific test entry environment and resulting from one or more of previous executions of the test in the specific test entry environment; and
evaluate the actual test results against the one or more expected test results to determine if the test was successfully performed in the test environment.

28. The computer program product as recited in claim 27, wherein the one or more computer-readable storage media farther comprise computer-executable instructions that, when executed by a processor, cause the computer system to perform the following:
send the environmental data along with a test type indication to the results retrieval sub-system for determining if a match exists between the one or more environmental conditions and the one or more expected test results.

29. The computer program product as recited in claim 27, wherein the one or more computer-readable storage media farther comprise computer-executable instructions that, when executed by a processor, cause the computer system to perform the following:
send a results update to the results retrieval sub-system, the results update including at least the actual test results.

30. The computer program product as recited in claim 27, wherein the one or more computer-readable storage media farther comprise computer-executable instructions that, when executed by a processor, cause the computer system to perform the following:
send evaluation results to an analysis sub-system, the evaluation results including at least the actual test results and indication of whether the test was successful.

31. The computer program product as recited in claim 27, wherein the one or more computer-readable storage media are physical media.

32. The computer program product as recited in claim 27, wherein the one or more computer-readable storage media include system memory.

33. A computer program product for use in a computer system that includes a results retrieval sub-system for retrieving expected results of a test of an object that typically produces different resulting output for different test environments, the computer program product for implementing a method for creating consistent evaluation of the object across multiple testing environments without having to generate or maintain new or additional test instructions for varying environments by retrieving expected results that are to be used to determine if a test was successful, the computer program product comprising one or more computer-readable storage media having stored thereon computer executable instructions that, when executed by a processor, cause the computer system to perform the following:

receive environmental data that defines a test environment under which actual test results are generated indicating that a test was performed in the test environment;

in response to receiving environmental data when attempting to find a match therewith, comparing the received environmental data with a set of test entry environments stored in a database, wherein each test entry environment of the set corresponds to a particular environment for which the test was previously executed;

based on the comparing, select a specific test entry environment from among the set of test entry environments stored in the database, wherein on or more environmental conditions for the selected specific test entry environment have increased commonality with one or more environmental conditions of the environmental data;

based on the selection of the specific test entry environment, identify one or more expected test results from a results database, the identified one or more expected test results being keyed to the selected specific test entry environment and resulting from one or more of previous executions of the test in the specific test environment; and send the identified one or more expected test results to a results evaluation sub-system in response to receiving the environmental data to determine if the test was successfully performed in the test environment.

34. The computer program product as recited in claim 33, wherein the one or more computer-readable storage media further comprise computer-executable instructions that, when executed by a processor, cause the computer system to perform the following:

receive a results update from the results evaluation sub-system, the results update included actual test results from a test executed in a new test environment; and store the actual results in the results database such that the actual results can be used to determine successfulness of subsequently executed tests.

35. The computer program product as recited in claim 33, wherein the one or more computer-readable storage media are physical media.

36. The computer program product as recited in claim 33, wherein the one or more computer-readable storage media include system memory.

* * * * *